E. T. BLOCH.
APPARATUS FOR THE TREATMENT OF THE LIMBS OF THE HUMAN BODY.
APPLICATION FILED MAY 5, 1914.
1,136,397.
Patented Apr. 20, 1915.
3 SHEETS—SHEET 3.
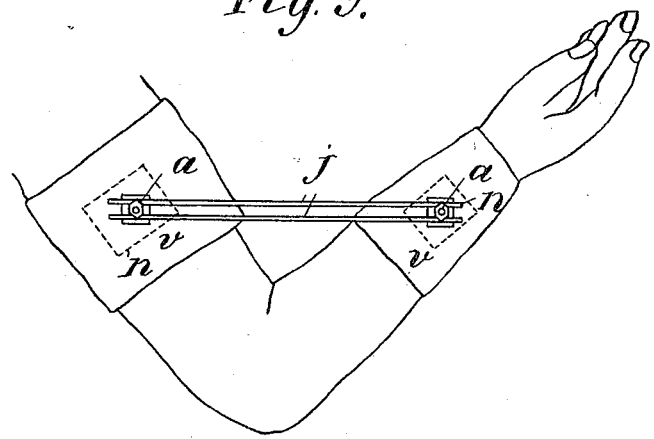
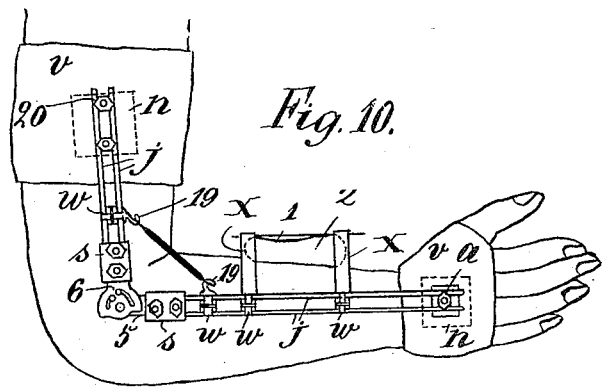
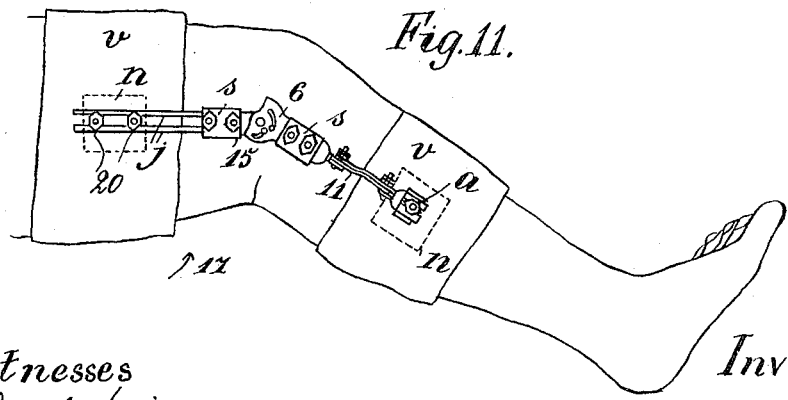
Witnesses
John N. Hoving
Cornelius Hoving
Inventor
E. T. Bloch
By H. van Dedem
Attorney

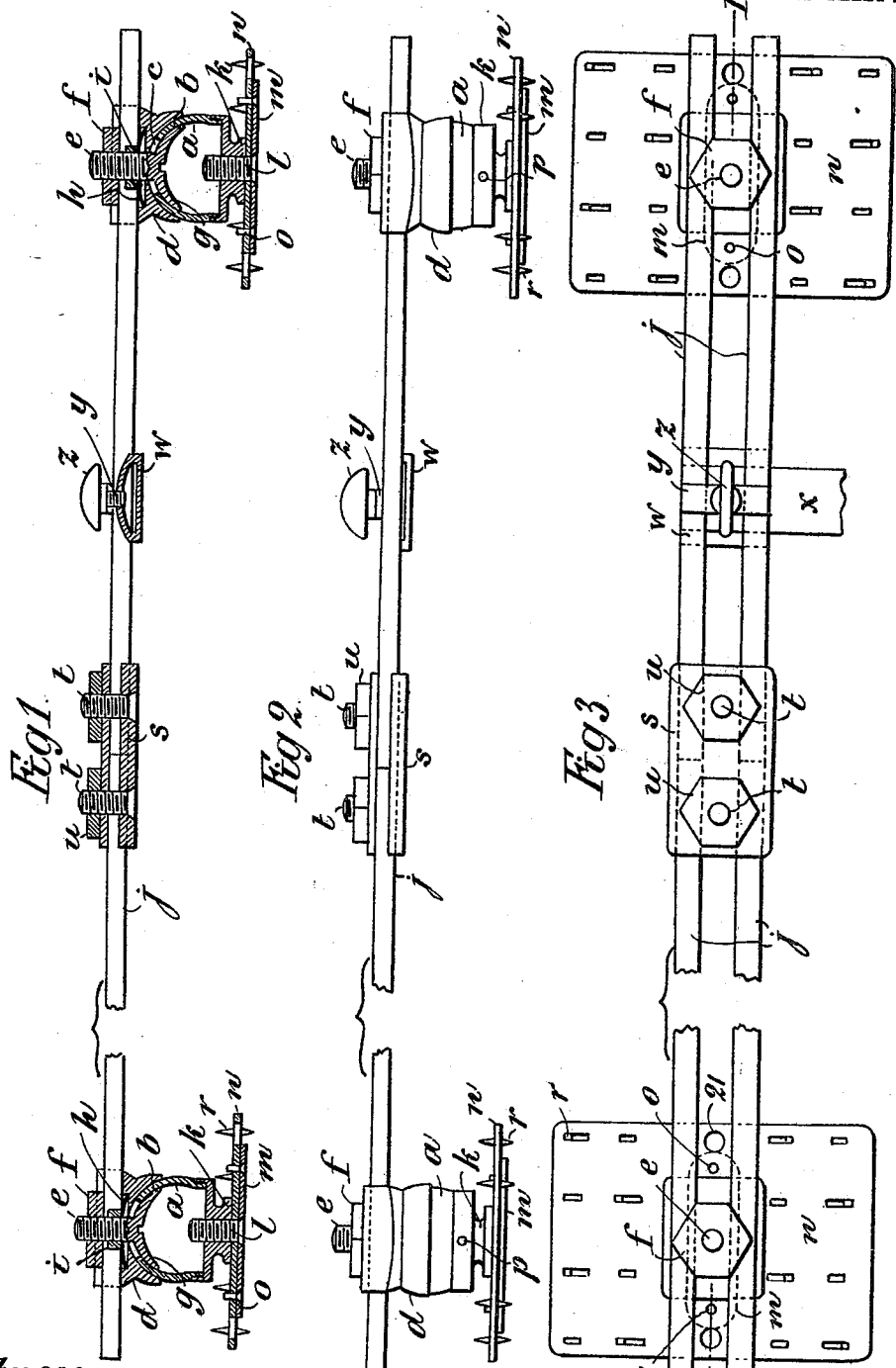

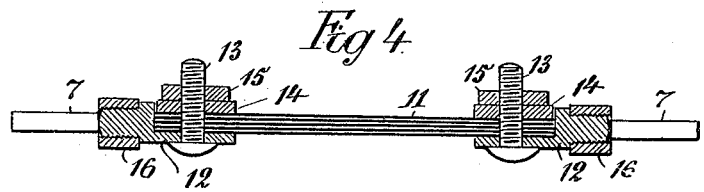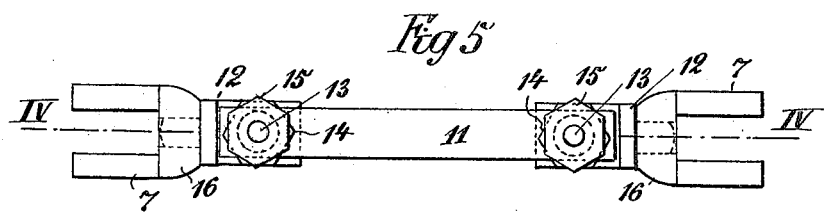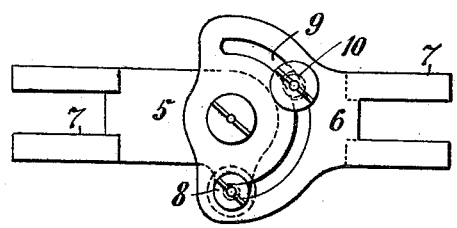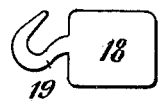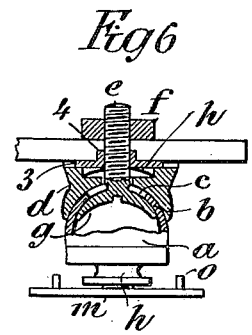

UNITED STATES PATENT OFFICE.

EMANUEL TREPKA BLOCH, OF LEJRE, DENMARK.

APPARATUS FOR THE TREATMENT OF THE LIMBS OF THE HUMAN BODY.

1,136,397. Specification of Letters Patent. Patented Apr. 20, 1915.

Application filed May 5, 1914. Serial No. 836,498.

*To all whom it may concern:*

Be it known that I, EMANUEL TREPKA BLOCH, a subject of the King of Denmark, and residing at Lejre, Denmark, have invented a new and useful Apparatus for the Treatment of the Limbs of the Human Body; and I do hereby declare the following to be a full, clear, and exact description of the same.

This invention refers to an apparatus for the treatment of surgical cases (fractures, dislocations, contractions, etc.)

The apparatus is composed of several different members, depending upon the nature of the case and the object of the treatment, and, by means of the various thus combined members, it is possible, by exercising conditional power in conditional directions, to immobilize or mobilize a limb of the human body.

The members of the apparatus consist of supports, the surfaces of which are surfaces of a ball, said supports articulating with main members, by means of which splints, or rods, may be held immovable for bandaging (for instance with plaster-bandages,) in which are disposed metal plates which can also be fastened immovably to the buttons. By a slight alteration, these supports may be easily transformed into ball-joints. The distance between two such supports fastened to one splint may be altered by shifting the supports, or also by combining several splints into one by means of splint-clamps. On the splints there may furthermore be clamped fast other clamps for the purpose of clamping fast metal strips, which serve as pad-holders. Splint-clamps are also used for securing spring-members of variable strength and disposed so as to spring in variable planes, which springs can be disposed between combined splints or in prolongation of a splint and for securing hinges and joints. All these members, together with screws, bolts, and nuts, etc., may be so combined that by their means multifarious orthopedic bandages may be constructed, both for adults and children, and especially for use in affections of the extremities, but also in affections of the trunk.

The accompanying drawings set forth forms of construction of the most important members of the apparatus, as well as a few uses of the same.

Figure 1 is a longitudinal section of a splint (along the line I—I in Fig. 3) with two supports and a few clamps, Fig. 2 is a side view of the same, Fig. 3 is a top view of the same, Fig. 4 shows a set of springs with appertaining connecting parts, being a section along the line IV—IV in Fig. 5, Fig. 5 is a top view of the same, Fig. 6 is a section of a support transformed into a ball-joint, Fig. 7 is a top view of a hinge-joint, Fig. 8 is a top view of a hook, Fig. 9 shows the apparatus combined for the immobilization of an arm, Figs. 10 and 11 show other combinations of the apparatus for mobilization of an arm and a leg, respectively.

The support is situated at $a$. At its top it has a spherical surface $b$, both inside and outside, only interrupted by a hole $c$. On the outside spherical surface $b$ slides the main piece $d$, which is secured to the support by means of a screw $e$ with nut $f$. The lower end of the screw $e$ is furnished with a head $g$, the surface of which is spherical, and is thus able to slide on the interior spherical surface of the support. This screw-head is so large that, when the nut is tightened, it will be clamped fast against the interior concave surface of the support, no matter what angle the screw may have in relation to the support. In the main piece $d$ there is disposed a little flat spring $h$ which is pressed down by means of the little nut $i$. In its extreme position, the side of the screw rests against the edge of the hole, without the edge of the screw-head passing the edge of the hole, so that the screw-head $g$ in all positions covers the hole $c$. The flat spring $h$ is given a sufficient tension, by means of its little nut $i$, to prevent the main piece from falling to one side by its own weight when the splints are not secured in position, but not sufficient to prevent said main piece from moving on the convex surface of the button with soft friction, thus making it convenient to adjust the splints on the main piece before securing them to the support. The splints $j$ are laid down in the bearings formed in the front part of the main piece. Then the nut $f$ is put on and drawn tight, thereby securing the splint unmovably to the support.

The foot-piece $k$ of the support has in its center a screw-hole into which the screw $l$ on the foot-plate $m$ can be screwed up. Between the foot-piece $k$ and the foot-plate $m$ there is laid a metal plate $n$. When the screw $l$ is screwed entirely up, the plate $n$ is secured unmovably, the turning of the plate being prevented by a pair of pins $o$ on the foot-plate $m$ passing up through corresponding holes in the plate $n$. In the foot-piece $k$ there are a pair of holes $p$ (Fig. 2), in which the pins of a top-key can mesh, said key being used to tighten the screw $l$. The plate $n$ is supplied with upwardly and downwardly extending barbs $r$ by the help of which the plate is held fast to a bandage (for instance, a plaster-bandage).

In Figs. 1–3 the splints are shown consisting of four single splints $j$, which are in pairs secured each pair to a support $a$. The two double splints are united to form a single double splint by means of a splint-clamp. The splint-clamp consists of a foot-plate $s$, with bearing for the splints, and two screws $t$ which are passed up between the splints $j$. On tightening the nuts $u$, the splints are securely united, so that they all act as one splint. In order to secure a human limb, for instance an arm (Fig. 9) it is customary to use two double splints $j$ disposed opposite to each other, each secured to two supports $a$ at the ends of the double splints, the two metal plates $n$, unmovably united to the supports $a$, being secured in bandages $v$ (for instance plaster bandages) adapted to the shape of the limb. On Figs. 1–3 there is shown, beside the splint-clamp, another clamp, a pad-holder, by means of which may be clamped fast a strip of plate, which, in its turn, holds fast a pad. The pad-holder consists of a strap-shaped plate $w$ furnished with a screw-hole. In the plate $w$ may be inserted a strip of plate $x$ (Fig. 3), which may be secured to the splint $j$ by means of the metal intermediate plate $y$ and the screw $z$. The splint should be able to be bent and wound, therefore the width of the strap is so small that the distance of the splints does not need to be constant. The cross section of each strap has the shape of an elongated rectangle, rendering the splint very flexible.

The use of the pad-holder is shown in Fig. 10. The strips of plate are fastened to the lower side of the splints $j$ by means of the pad-holders $w$. These strips of plate are carried farther to the corresponding pad-holders on splints disposed just opposite those shown on the drawing. Thus the arm may be surrounded transversely with a half or whole strip of plate running around it and stationary in relation to the arm. To these transverse strips of plate $x$ one or more longitudinal strips of plate $l$ may be secured. In this manner the pad 2 is held fast. Since these strips of plate with pads may be disposed anywhere on splints of variable length, it is thereby possible to exercise a great transverse force on the limb, depending upon the shape and size of the pad.

Force in directions approaching the longitudinal (both pulling and pressure) may be exercised on the limb (for instance an arm, Fig. 9) by longitudinally moving the supports secured to one of the bandage-rings (for instance the distal ring) of the limb, when the nuts $f$ of these supports are loosened but the nuts of the two proximal supports are turned down tight. Thus the two distal supports slide with their main-pieces under the splints secured by the two proximal supports, and will transmit a traction which is transmitted through the distal bandage-ring to the limb. It is also possible to accomplish a traction (for instance in case of a broken bone) or a pressure-effect in another manner by loosening all four nuts $f$ (Fig. 9) and then grasping the two plaster-rings $v$ and moving them farther away from each other, thus exercising a traction on the limb secured between them, after which the two plaster-rings are secured in relation to each other by tightening the four nuts, all on condition that the plaster-rings meet resistance against shifting position in relation to the limb.

Since the distal bandage-ring can not only be shifted in a longitudinal direction in relation to the proximal bandage-ring, but can also be shifted laterally (by means of an angular movement of the main-pieces on the four supports, Fig. 9, and by means of the bending of the splints or of turning the splints around a conditional axis by means of two handles specially constructed for that purpose for accomplishing greater lateral modifications), a limb lying in said distal bandage-ring may, in this manner, also be affected by lateral force, after the four nuts are again tightened, thereby securing the splints in position. Thus we see that, by means of this apparatus, we are able to immobilize a limb by the exercising of conditional force in conditional directions in every desirable place. In order to satisfy the same demands during the movement of the joints, we must use, in addition to the aforesaid parts, also ball-joints, hinges, springs, and hooks.

The support may be transformed into a ball-joint (Fig. 6) by removing the nut $i$ and substituting it by a turn-plate 3 with collar 4 perforated by a screw-threaded hole corresponding to the screw $e$. The splints are then clamped in between the turn-plate 3 and the nut $f$, thereby forming a ball-joint, the articulating surfaces of which move with a slight friction against each other, owing to the pressure which the turn-plate exercises upon the spring $h$, which transfers it on to the main-piece $d$. Thus the latter can be turned, with a slight friction, around the upper spherical surface of the support, while both splint and support are held unmovably secured, unless such a turning were prevented by the up-standing edges of the main-piece lying on the lateral surfaces of the splints. The hinge-joint (Fig. 7) consists of two parts 5 and 6 connected with the joint, each of which ends in two splint-sections 7 corresponding to the splints j, whereby they can be united to splints by means of splint-clamps. The piece 5 bears a screw 8 which passes up through a semi-circular guide-slit 9 in the piece 6. By tightening the screw 8, the two hinge-members 5 and 6 can be secured in relation to each other. In the slit 9 may be shifted and screwed fast a screw 10, which serves to limit the movement of the hinge.

The spring is compound (Figs. 4 and 5) and consists of several thin, flat springs 11, which are perforated at the ends. They are laid in the desired numbers, the one on top of the other, and are secured to two holder-pieces 12 by means of screws 13 with nuts 14 and counter-nuts 15. The holder-pieces 12 are screwed into pieces 16 which, like the hinge-joints, are furnished with splint-sections 7, by means of which they can be united to the splints, hinge-joints, etc. The thickness of the spring, and consequently its strength, may be varied within wide limits, and its spring-plane may be varied independently of the angular position of the pieces 16, since the pieces 12 can be turned in the pieces 16, a turning which the spring, when once inserted in a double splint, will accomplish of its own accord when the spring is brought to a tension.

The object of the hinge-joints 5, 6, will be readily seen in Figs. 10 and 11. In the latter figure there is inserted a spring 11 which takes the place of a double splint or transforms it in a part to a spring of suitable strength and of suitable spring-plane, thereby insuring the constant maintenance of a weak spring-pressure, notwithstanding the movement in the knee-joint. Thus during this movement a pressure is constantly exercised at a right angle to the longitudinal axis of the lower leg (see the arrow 17).

The hook (Fig. 8) consists of a piece of plate 18 with a hook 19. The piece of plate 18 can, the same as the strips of plate x, be clamped fast to a double splint by means of a pad holder w.

In Figs. 10 and 11 there are shown some combinations of the already described parts for immobilization and the later on described parts for mobilization of the limbs. In Fig. 10 there is disposed, between the two hooks 19, an elastic band (an artificial muscle). All the other parts shown in these two figures have already been described, and do not need any further description.

Having thus described my invention, I claim as new and desire to secure by Letters Patent:

1. In a surgical apparatus, the combination of a splint comprising a pair of spaced members; a bearing member adapted to engage between said members and provided with a socket having an inner spherical surface; a support provided with a partially spherical portion adapted to engage the surface of the socket; a screw passing through said splint bearing member and portion and provided with a head engaging in said spherical portion; a nut on said screw; and a flat spring interposed between said bearing and the splint members for modifying the friction between the contacting surfaces of said head, spherical portion and bearing members.

2. In a surgical apparatus, the combination of a splint comprising a pair of spaced members; a bearing member adapted to engage between said members and provided with a socket having an inner spherical surface; a support provided with a partially spherical portion adapted to engage the surface of the socket; a screw passing through said splint bearing member and portion and provided with a head engaging in said spherical portion; a nut on said screw; a flat disk interposed between said bearing and the splint members and having threaded engagement with said screw; and a flat spring interposed between the bearing member and disk.

3. In a surgical apparatus, the combination of, a splint comprising spaced members; and a pad holder comprising a strap plate having upturned ends engaging between said members; a strap adapted to pass between said ends and between the plate and said members, an intermediate plate adapted to rest on said members, and a wing screw passing through the intermediate plate into the intermediate plate and into the strap plate.

4. In a surgical apparatus, a pair of spaced members each having an outer flat face; a strap plate contacting the inner face of said members and having a projection engaging therebetween; a strap engaged and held thereby; an intermediate plate having both its breadth and thickness each less than the width of the space between said members, and having an inner flat face adapted to engage the flat faces of said members; and a screw passing through the intermediate plate into the strap plate.

5. In a surgical apparatus, the combination of a splint, a bearing member adjustably secured thereon; a support having universal connection with the bearing member and having a foot piece having a screw hole; a foot plate having thereon a screw engaging in said screw hole; and a metal plate interposed between the foot plate and foot piece, and adapted to have a bandage secured thereto.

6. In a surgical apparatus, a pair of spaced members; means for holding said members in fixed spaced relation at certain points; a strap plate engaging the inner faces of said members; a strap engaged and held thereby; an intermediate plate having its principal plane in parallel relation to the principal plane of the strap plate; and a screw passing through the intermediate plate into the strap plate; the intermediate plate having both its breadth and thickness each less than the width of the space between the members.

In testimony whereof I affix my signature in presence of two witnesses.

EMANUEL TREPKA BLOCH.

Witnesses:
VIGGO BLOM,
FRITZ FREDERIKSEN.

Copies of this patent may be obtained for five cents each, by addressing the "Commissioner of Patents, Washington, D. C."